United States Patent [19]
Yin et al.

[11] Patent Number: 5,670,020
[45] Date of Patent: Sep. 23, 1997

[54] FOAM SEPARATION METHOD FOR REDUCING AOX, COD, AND COLOR BODIES OF KRAFT PULP BLEACH PLANT EFFLUENTS

[75] Inventors: Caifang Yin, Monroe; Christopher P. Hung, Highland Mills, both of N.Y.

[73] Assignee: International Paper Company, Purchase, N.Y.

[21] Appl. No.: 456,730

[22] Filed: Jun. 1, 1995

[51] Int. Cl.$^6$ .................................................. D21C 11/00
[52] U.S. Cl. .................. 162/29; 162/30.11; 162/DIG. 8; 210/917; 210/928
[58] Field of Search ...................... 162/29, 30.11, 162/DIG. 8; 210/705, 727, 734, 917, 928

[56] References Cited

U.S. PATENT DOCUMENTS

| | | | |
|---|---|---|---|
| 2,874,842 | 2/1959 | Krofta | 210/70 |
| 4,626,356 | 12/1986 | Suzuki et al. | 210/705 |
| 4,724,045 | 2/1988 | Ackel | 162/29 |
| 4,738,750 | 4/1988 | Ackel | 162/29 |
| 4,783,263 | 11/1988 | Trost et al. | 210/638 |
| 5,013,454 | 5/1991 | Hynninen | 210/718 |
| 5,178,770 | 1/1993 | Chung | 210/705 |
| 5,374,333 | 12/1994 | Nykanen et al. | 162/31 |

*Primary Examiner*—Donald E. Czaja
*Assistant Examiner*—Dean T. Nguyen
*Attorney, Agent, or Firm*—Luedeka, Neely & Graham, P.C.

[57] ABSTRACT

The invention described in the specification relates to a process and apparatus for reducing AOX, COD and color bodies from the filtrate streams generated by a kraft pulp bleaching sequence. The method involves vigorously mixing an $F_D$ filtrate with an $F_E$ filtrate to form a filtrate mixture and treating the filtrate mixture with a coagulating compound, a flocculating compound and recycled foam concentrate. After chemically treating the filtrate mixture, the mixture is foamed with air in order to capture floc which formed in the mixture. Concentration of the foam and recycle of the foam to the filtrate mixture has been found to significantly increase the concentration of and reduce the amount of solids generated in the treatment system.

20 Claims, 2 Drawing Sheets

FOAM SEPARATION METHOD FOR REDUCING AOX, COD, AND COLOR BODIES OF KRAFT PULP BLEACH PLANT EFFLUENTS

FIELD OF THE INVENTION

The present invention relates to a method and apparatus for reducing adsorbable organic halides, chemical oxygen demand, toxicity and color containing compounds in pulp bleach plant effluent streams.

BACKGROUND OF THE INVENTION

Recent environmental regulations propose more stringent containment and/or treatment regulations for bleach plant effluent containing adsorbable organic halides (AOX), biologically recalcitrant chemical oxygen demand (COD) materials, toxicity and color containing compounds. While these more stringent regulations may be met with currently available treatment systems, the costs for achieving the proposed limits are excessive in many instances. In some situations major plant modifications may be required in order to effectively reduce the subject pollutants to the required level. In other situations, converting from elemental chlorine-free (ECF) bleaching to totally free chlorine (TCF) bleaching may be the most cost effective means to achieve the reduction in pollutants proposed in the environmental regulations. However, the conversion of bleaching plants from ECF to TCF may require major plant modifications.

Conventional pulp bleaching plants use halogen agents, which are the major source of AOX in the effluent streams. A conventional bleaching sequence for softwood pulp treated in accordance with the sulfate process is $$(C+D)E_1DE_2D$$

wherein (C+D) is a stage for the addition of chlorine (C) and chlorine dioxide (D), either simultaneously or sequentially; D is a chlorine dioxide addition stage, and $E_1$ and $E_2$ are alkaline extraction stages, optionally with addition of peroxide ($E_p$) and/or oxygen ($E_{op}$ or $E_o$). In the above bleaching sequence, the (C+D) stage and the $E_1$ stage are often referred to as the prebleaching stages. The sequence $DE_2D$ is called the final bleaching stage. In an elemental chlorine-free pulp bleaching plant, a bleaching sequence such as $D_cE_{op}D$ may be used.

The reaction products formed in the bleaching stages using halogen-containing compounds give rise to discharges containing halogenated organic compounds. These compounds are measured as absorbable organic halogen (AOX). When chlorine dioxide is used instead of elemental chlorine, the AOX may be significantly reduced. Processes using only chlorine dioxide in the prebleaching stage are typically known as elemental chlorine-free (ECF) bleaching processes. While the use of chlorine dioxide in place of elemental chlorine has reduced the level of AOX in plant effluent, there continues to be a need to further reduce the level of these compounds.

In addition to AOX, pulp bleach plant effluents typically have a high chemical oxygen demand (COD) and a high color content. Conventional primary treatment systems are designed to reduce only suspended solids (SS), not AOX, COD and color. Other treatment systems may reduce the AOX and color of the effluent but fail to reduce the COD. Secondary or biological treatment systems are useful for reducing the biochemical oxygen demand (BOD) of the effluent but typically do not reduce color and are only moderately effective in removing AOX and COD.

Accordingly, it is an object of the present invention to provide a cost effective method for reducing pollutants in the effluent discharged from a pulp bleach plant.

Another object of the invention is to provide a method for treating the filtrate from a pulp bleach plant whereby the effectiveness of secondary and/or tertiary treatment is increased.

Still another object of the invention is to reduce the amount of pollutants in plant filtrate streams without adversely affecting the biological treatment systems used for subsequent treatment of the filtrate streams to reduce BOD.

Yet another object of the invention is to condition filtrate streams so that subsequent biological treatment becomes more effective.

An additional object of the invention is to provide a method for treating pulp bleach plant effluent which reduces the AOX, COD and color of the effluent.

A further object of the invention is to provide a method for treating pulp bleach plant effluent which enables reduction of pollutants in the plant discharge stream to acceptably low levels in accordance with applicable standards.

A still further object of the invention is to provide a method for treating pulp bleach plant effluent which avoids radical or expensive modifications in existing plant equipment or processes.

SUMMARY OF THE INVENTION

With regard to the above and other objects, the present invention provides a method for treating effluent from a kraft pulp bleach sequence having a chlorine and/or chlorine dioxide stage generating an organic chloride compound-containing filtrate ($F_D$) and an alkaline extraction stage generating an extraction stage filtrate ($F_E$) wherein the $F_D$ and $F_E$ filtrates contribute to the amount of the chemical oxygen demand (COD), adsorbable organic halides (AOX), color bodies and toxicity in the bleach plant effluent. The method comprises contacting the $F_D$ filtrate with the $F_E$ filtrate in an $F_D$ to $F_E$ ratio within the range of about 0.5:1 to about 4:1 thereby providing an $F_DF_E$ mixture, which is then intensely mixed for a mixing interval sufficient to reduce the amount of AOX in the $F_DF_E$ mixture.

The $F_DF_E$ mixture is then contacted with a coagulating compound and foam concentrate to form a pre-foam mixture. A floc is then formed in the pre-foam mixture by contacting the pre-foam mixture with a flocculating compound.

After flocculating, the pre-foam mixture is foamed in a foaming vessel with an amount of air sufficient to form a foam containing coagulated floc and entrained liquids. The foam is collected and treated to release the entrained liquid by breaking the foam in a foam breaker to form a foam concentrate and a liquid phase. The foam concentrate and liquid may then be separated, one from the other, in a foam clarifier section. A substantial portion of the foam concentrate is recycled to the $F_DF_E$ mixture thereby recovering and reusing a substantial portion of the coagulating and flocculating chemicals and reducing the amount of sludge discharged from the treatment system. The liquid phases obtained in the foaming vessel and foam clarifier section which have substantially reduced AOX, COD and color content are discharged from the foaming vessel and foam clarifier section so that they may be further treated in a primary or secondary treatment system.

A particular advantage of the present treatment system is that major modifications of the bleach plant operations are minimized and expensive chemicals are conserved while achieving a significant reduction in AOX, COD and color bodies in the effluent from a pulp bleaching sequence. Furthermore, contrary to conventional techniques, acidic and alkaline filtrate streams which are often kept separate because of the typically low level of suspended solids in the acidic streams may now be combined in a ratio that achieves a significant reduction in AOX.

The methods and apparatus of the present invention may be employed prior to a primary or secondary treatment system. Accordingly, the effectiveness of a primary or secondary treatment system may be enhanced because of the reduced loading of pollutants achieved prior to the use of such conventional treatment systems.

SUMMARY OF THE DRAWINGS

The above and other aspects of the present invention will now be further described in the following detailed description of various preferred embodiments in conjunction with the accompanying drawings in which.

DETAILED DESCRIPTION OF THE INVENTION

The present invention is directed to a process for treating filtrate streams from a chlorine-based pulp bleaching sequence having a chlorine and/or chlorine dioxide stage generating an organic chloride compound-containing filtrate ($F_D$) and an alkaline extraction stage generating an extraction stage filtrate ($F_E$). As is known to those of ordinary skill, among the known kraft pulp bleaching sequences there exist variations of the $(C+D)E_1DE_2D$ bleaching sequence such as those disclosed in U.S. Pat. Nos. 4,959,124 and 5,389,201 to Ted Y. Tsai, incorporated herein by reference as if fully set forth.

The $F_D$ and $F_E$ filtrates are the liquid portions separated from the pulp in the bleaching and extraction stages respectively. Liquid may be separated from the pulp by vacuum or pressure filtration, centrifugation, decantation, screening or any other well known means. Typically, the liquid separated from the pulp will contain, among other things, components contributing to the AOX, COD and color body content of the filtrate streams. While the $F_D$ and $F_E$ filtrates contribute the largest portion of the total AOX, COD and color body content in the effluent streams exiting a kraft pulp bleaching plant, other less defined sources of AOX, COD and color bodies may be combined with the $F_D$ and $F_E$ filtrates and then treated by the process of the present invention.

In a preferred embodiment, the $F_D$ filtrate, preferably from the first chlorine dioxide bleaching stage, is vigorously and intensely mixed with the $F_E$ filtrate, preferably the first alkaline extraction stage of the bleaching sequence, to form a filtrate mixture ($F_DF_E$). The $F_DF_E$ mixture is then contacted with a coagulating compound and foam concentrate to provide a hydrophobic color containing component in the mixture.

The $F_DF_E$ mixture containing coagulant and foam concentrate is then contacted with a flocculating compound to produce a floc containing hydrophobic solids formed by contact with the coagulant. The foam concentrate may initially be formed as during start-up from a synthetic mixture of $F_D$ and $F_E$ filtrates, coagulant and flocculent or, preferably, the foam concentrate may be provided as stored recycle from a downstream step of a previous filtrate treatment cycle.

After forming the flocculated mixture, the mixture is conducted to a foaming vessel where air is introduced with sufficient turbulence to induce foaming. Once formed, the foam containing the floc and entrained liquid is collected and transferred to a foam breaking vessel. In the foam breaking vessel, the foam is reduced under conditions which preserve the floc yet release a substantial portion of the entrained liquid from the foam thereby forming a foam concentrate and a liquid phase. The foam concentrate is separated from the liquid phase in a foam clarification section and a substantial portion of the concentrate is recycled to the flocculated mixture while the liquid phase is treated in a conventional primary or secondary treatment system to thereby further reduce pollutants exiting the treatment system.

A key feature of the invention is the very intense and vigorous mixing of two filtrate streams which are frequently kept separate. The $F_D$ filtrate stream typically has a low pH and a relatively low suspended solids content. On the other hand, the $F_E$ filtrate stream typically contains a high level of suspended solids and has a relatively high pH.

Because of its low suspended solids content and the relatively high volume of the $F_D$ filtrate, treatment of this stream in a primary treatment system for removal of suspended solids is not very cost effective as compared to primary treatment of the $F_E$ filtrate. As a consequence, $F_D$ filtrate stream and the $F_E$ filtrate stream are often kept separate in order to reduce the size of the suspended solids removal system.

Contrary to conventional wisdom, the present invention combines the $F_D$ filtrate with the $F_E$ filtrate with intense mixing in a volume ratio of from about 0.5:1 to about 4:1 to obtain a significant and unexpected reduction in the amount of AOX initially present in the filtrates and to provide a stream suitable for removal of soluble color bodies by the foaming methods of the present invention.

The $F_D$ filtrate will typically contain chlorinated organic compounds as a result of the use of chlorine-containing compounds in the first bleaching stage or other chlorine-based stages. Such a filtrate stream may have a pH in the range of from about 1.5 to about 4. Chlorine-containing compounds which may be used to bleach kraft pulp include chlorine, chlorine dioxide, chlorite of alkali metals or alkaline earth metals and hypochlorite of alkali metals or alkaline earth metals. Other halogens, e.g., fluorine, bromine and iodine, have seen limited use for kraft pulp bleaching, and this invention is not necessarily limited to the treatment of filtrates from a chlorine compound-containing bleaching sequence.

Organic substances which may be chlorinated as a result of the chlorine compound bleaching of kraft wood pulp include, but are not limited to, cellulose, hemicellulose, extractive matter and aromatic and aliphatic lignin residues. The aromatic compounds in particular are difficult to degrade to acceptably low levels.

The bulk of the chlorinated organic compounds which are found in the $F_D$ filtrate are usually formed in the first bleaching stages of the pulp bleaching process. Accordingly, an $F_D$ filtrate from an initial bleach stage may contain from about 70 to about 90 wt. % of the total AOX generated during the entire bleaching sequence. Since the filtrate from the first bleaching stage contains the highest level of AOX, a significant reduction in the AOX content of this stream translates into a substantial reduction in AOX of the effluent stream from the pulp bleaching plant.

The $F_E$ filtrate from the first alkaline extraction stage may result from treatment of the pulp with peroxide and/or oxygen along with an alkaline agent, typically sodium hydroxide, and will often have a pH within the range of from about 10 to about 12. The $F_E$ filtrate will typically contain a significant portion of the organic solids removed during bleaching as well as most of the color bodies which are principally made up of soluble lignin compounds removed from the pulp. Recycle or reuse of at least a portion of the $F_E$ filtrate may reduce the level of organic solids and color bodies leaving the bleach plant. However, much of the filtrate will still require treatment and disposal.

For carrying out the process of the invention, it is preferred to combine and mix $F_D$ filtrate, preferably from the first chlorine dioxide bleaching stage, with the $F_E$ filtrate, preferably from the first extraction stage, so that the pH of the combined filtrates is within the range of from about 3.0 to about 4.5. Accordingly, it has been found that a volume ratio of $F_D$ filtrate to the $F_E$ filtrate of from about 1:1 to about 3:1 will, in many instances, result in a pH of from about 3.0 to about 4.5 for the combined $F_DF_E$ filtrate. If the desired pH is difficult to obtain simply by combining the streams in a ratio within the foregoing range, acids or bases may be added to the mixed filtrates.

Vigorous mixing of the filtrates is an important aspect of the invention. Although numerous mixing methods and apparatus are known and may be used in the invention, a preferred apparatus is an in-line static mixer or a venturi mixer for obtaining very thorough and intense mixing of the filtrate streams. Such static or venturi mixers may achieve adequate mixing of the filtrate streams in about 30 seconds to about one minute. Other mixing techniques may require from about 30 seconds to about 30 minutes. However, shorter mixing times are more desirable in order to reduce the size of equipment required to achieve a thoroughly mixed filtrate exiting the mixer.

It is preferred to mix the $F_D$ and $F_E$ filtrates by directing the $F_E$ filtrate stream directly into the $F_D$ filtrate stream as by a venturi mixer or other suitable conduit arrangements to form a "Y" and to begin mixing at the confluence of the two streams. However, the $F_D$ and $F_E$ filtrates may be conducted to a surge vessel, mixing tank or other suitable equipment arrangement functioning as a manifold to merge the streams for mixing. It is to be noted that filtrate from other bleaching and extraction stages may be combined with the $F_D$ and $F_E$ filtrates according to the process of the present invention. However, since the $F_D$ and $F_E$ filtrates contain the great majority of compounds to be treated, a significant reduction of AOX, and/or toxicity may be achieved when the $F_D$ and $F_E$ filtrates alone are combined and treated.

In the next step of the process, the $F_DF_E$ mixture is contacted with a coagulant to destabilize and decrease the hydrophilic nature of soluble color bodies in the mixture so that there is an increase in the amount of solids and/or floccule in later stages of the process.

Suitable inorganic coagulants for use in the invention include aqueous solutions of polyaluminum halides such as polyaluminum chloride and polymeric aluminum-silicate salts such as polymeric aluminum-silicate sulfate. Organic coagulants which may be used include alkyl ammonium halides, such as cetyldimethylethyl-ammonium bromide, polyamines and proprietary coagulants such as HEXAFLOC 820Z commercially available from Hexagon Chemical Company of Louisville, Ky. and BETZ CDP-9907 commercially available from Betz Laboratories, Inc. of Trevose, Pa. Of the foregoing, HEXAFLOC 820Z coagulant is particularly preferred.

The amount of coagulant used may range from 20 to 1000 or more milligrams per liter of $F_DF_E$ mixture treated. Typically the amount of coagulant will range from about 30 to about 200 milligrams per liter of $F_DF_E$ mixture. There is no known upper limit on the amount of coagulant which may be used, however, from an operational and economic point of view, an especially preferred amount of coagulant is at least about 50 milligrams per liter of $F_DF_E$ mixture treated.

Prior to, during or subsequent to contacting the $F_DF_E$ mixture with the coagulant, an amount of foam concentrate is added to the mixture. Under continuous or essentially steady-state operating conditions, more than about 50 vol. % of the foam concentrate formed in a later stage of the process is recycled to the $F_DF_E$ mixture during the coagulation step.

After contact with the coagulant and foam concentrate, the $F_DF_E$ mixture is then contacted with a flocculent to increase the size and density of solids formed in the coagulating step. Suitable flocculents may be selected from polyamines or polyamides such as polyquaternary amine and cationic or anionic polyacrylamide. Preferred flocculents include the cationic polyacrylamide water-in-oil emulsions such as MAGNIFLOC 1590C commercially available from Cytec Industries, Inc. of West Paterson, N.J.

A minor amount of flocculent is typically required. Accordingly, the amount of flocculent used may range from about 1 to about 20 milligrams per liter of $F_DF_E$ mixture. As with the coagulant, there is no known upper limit on the amount of flocculent which may be used. However, it is preferred to use at least about 4 milligrams of flocculent per liter of $F_DF_E$ mixture.

While not required, it may be desirable to add a surfactant to the coagulated and flocculated $F_DF_E$ mixture to increase and/or promote foaming so that solids containing the color bodies may be collected and removed with the foam from the treated filtrate. Suitable surfactants include alkylamines, quaternary ammonium salts, alkylammonium halides, alkylaryl sulfonates, fatty alcohol ether sulfonates, alphaolefin sulfonates, polyoxyalkylene ethers, and the like.

An important aspect of the invention is the use of concentrated foam to promote the removal of AOX, COD, color bodies and toxicity from the $F_DF_E$ mixture. The concentrated foam may be prepared synthetically and added to the $F_DF_E$ mixture containing the coagulant and flocculent, such as during start-up. It is highly preferred to provide the concentrated foam using concentrated foam formed in a prior treatment cycle or downstream of the foam addition point.

In order to significantly minimize the volume of sludge removed from the system, a substantial amount of the concentrated foam is recycled. Accordingly, more than about 50 vol. % of the foam, preferably more than 75 vol. % and, most preferably, more than about 99.5 vol. % of the concentrated foam is recycled and mixed with the $F_DF_E$ mixture, coagulant and flocculent. Not only does recycling of the concentrated foam significantly reduce the amount of sludge to be disposed of from the process, it also provides a significant reduction in the use of treatment chemicals since a substantial portion of unconsumed coagulant, flocculent and/or surfactant chemicals is contained in the concentrated foam which is recycled.

The coagulation, flocculation and foaming steps may be conducted at any desirable pressure ranging from subatmospheric to superatmospheric. For ease of operation and equipment design it is most desirable to conduct the process steps under atmospheric pressure conditions.

The temperature of the treatment process may vary within a wide range. It is preferred, however, to conduct the process at a temperature above the freezing point and below the boiling point of the $F_D$ filtrate, $F_E$ filtrate and $F_DF_E$ mixture during all steps of the process. Thus the temperature may be controlled by heating or cooling the individual process streams or preferably by mixing the $F_D$ and $F_E$ filtrate streams in the ratio about 1:1 to about 3:1 by volume without any additional heating or cooling steps.

Figure 1:
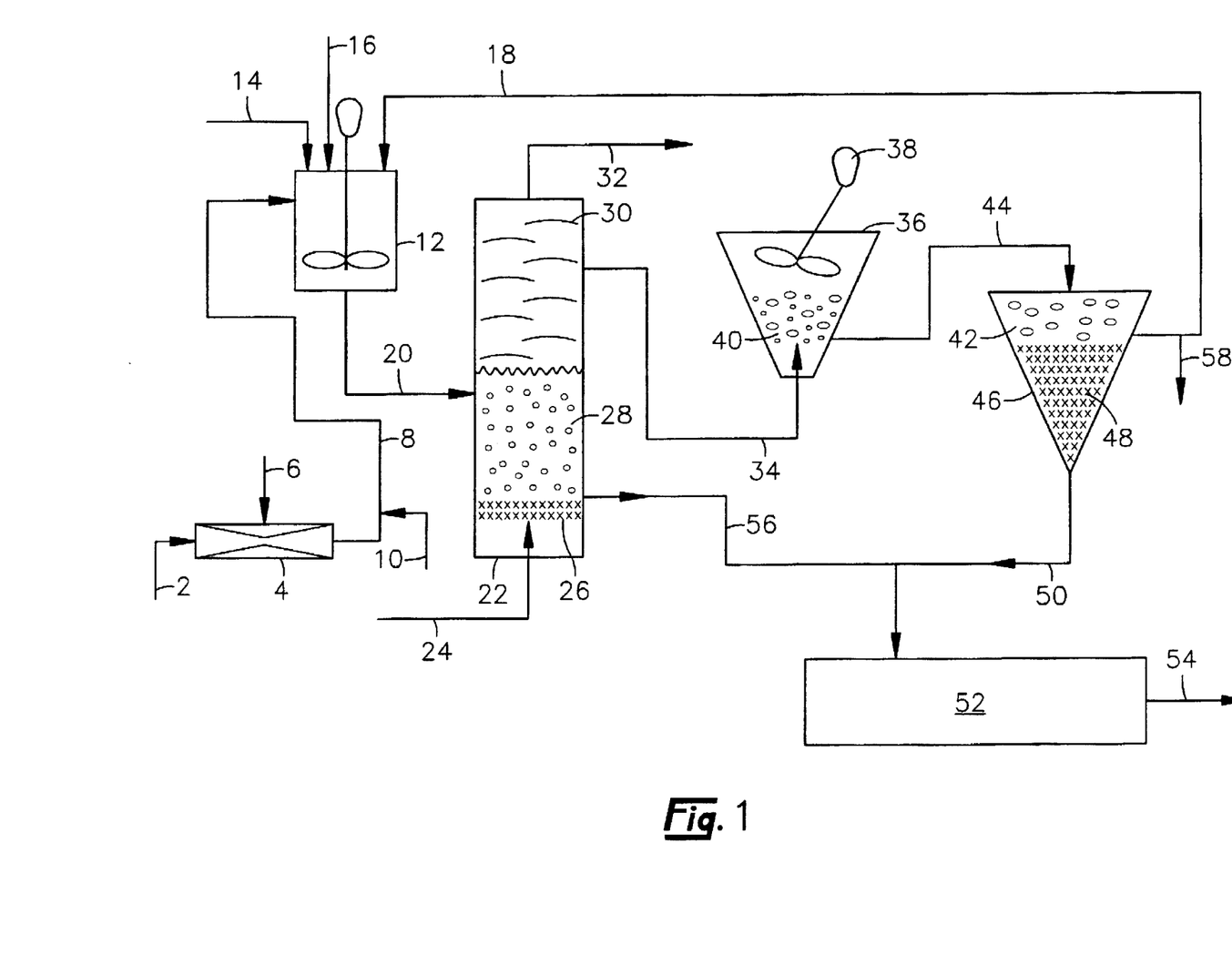
FIG. 1 is a block flow diagram of a preferred treatment system of the invention.

With reference now to FIG. 1, other aspects and features of the invention will be illustrated. The $F_D$ filtrate 2 at a temperature in the range of from about 30° to about 80° C. and a pH in the range of from about 1.5 to about 4.0 is combined in a mixer 4, preferably a venturi mixer, under intense mixing conditions with the $F_E$ filtrate 6 having a temperature in the range of from about 30° to about 90° C. and a pH in the range of from about 10.0 to about 12.0.

As explained above, if the combined $F_DF_E$ mixture 8 does not have a pH within the desired range, an acid or base may be added to the mixture 8 by means of addition conduit 10 in order to adjust the pH to the desired level.

The $F_DF_E$ mixture is then conducted to a contact device 12 for contact with the coagulant 14, flocculent 16, and an amount of recycled concentrated foam 18. The contact device 12 is preferably an agitated vessel or any other device suitable for intensely mixing the $F_DF_E$ mixture 8 with the coagulant 14, flocculent 16 and concentrated foam 18.

While FIG. 1 illustrates essentially simultaneous addition of the coagulant, flocculent and foam to mixing vessel 12, it is preferred to feed the coagulant and foam concentrate to the $F_DF_E$ mixture 8 in the vessel 12, prior to introducing the flocculent to the vessel. Accordingly, the coagulant 14 and concentrated foam 18 are preferably fed to the mixing vessel 12 and mixed with the $F_DF_E$ mixture 8 for at least about 30 seconds prior to the addition of the flocculent 16 and/or surfactant.

The delay in adding the flocculent and/or surfactant should not be so long, however, that there is insufficient mixing time prior to introducing the $F_DF_E$ mixture 8 containing the treatment chemicals to the foaming vessel 22.

The addition sequence for the flocculent and/or surfactant is not critical to the invention and they may be added to the $F_DF_E$ mixture containing the coagulant and concentrated foam in any order or essentially simultaneously. After addition of the flocculent and/or surfactant, the $F_DF_E$ mixture and chemicals are mixed for a period of time and at a gentle mixing rate which is sufficient to increase the amount and size of floc present in the chemically treated mixture. The agitation rate during the floc promoting step of the process should be high enough to promote good mixing, yet at a rate which does not break or reduce the amount of floc thus formed.

After sufficient agitation and floc formation, the chemically treated mixture 20 is fed to the foaming vessel 22 whereby the introduction of air 24 through a foraminous or perforate device 26 provides bubbles 28 for generating foam 30 from the treated mixture. The foraminous device 26 may be a fritted disk, wire mesh, perforated plate or any other apparatus suitable for generating small air bubbles in the treated mixture. The mesh size of the openings in the foraminous device 26 is important to the efficiency of the foam separation step. Accordingly, mesh sizes will preferably range from about 2 microns to about 700 microns. It is preferred to generate the smallest air bubbles possible so that more fine floc may be attached to the air bubbles and thereby removed from the mixture.

The amount of air used to generate sufficient bubbles for capture of floc has a gas/liquid ratio (G/L) ranging from about 0.05 to about 2.0 standard cubic feet per minute per gallon (SCFM/gal.) of effluent, preferably from about 0.08 to about 1.5 SCFM/gal., and most preferably a G/L ratio of from about 0.1 to about 1.0 SCFM/gal. of effluent.

The foam 30 thus generated results from the attachment of hydrophobic colloidal organic materials to the surface of the air bubbles. The air bubbles may also contain a portion of entrained liquid as a result of the rapid formation of the bubbles in the chemically treated mixture.

In order to prevent overpressurization of the foaming vessel 22, an atmospheric vent 32 is preferably provided. The vent 32 may directly exhaust to the ambient atmosphere, or it may be directed to an exhaust treatment system (not shown) for removal of any gaseous substances which cannot be directly discharged to the atmosphere.

After formation, the foam may be removed from the foaming vessel 22 and transferred to a foam breaking vessel 36 having a mechanical means 38 for gently breaking the foam 30 thereby releasing entrained liquid and concentrating the foam into a foam concentrate 42 in a foam clarifier 46. In the alternative, the foam may be broken by chemical means or any other means well known to those of ordinary skill. Whatever means is selected for breaking the foam and releasing entrained liquids, it is important that the foam breaking and clarification operations be relatively gentle so that a substantial portion of the floc remains intact whereby it can float on a liquid layer thus formed by the liquid released during the foam breaking and clarification operations. In this manner, the concentrated foam and liquid phase may readily be separated, one from the other, in a clarification section of the foam breaker, a separate foam clarifier or other device for separating the liquid phase from the foam following the foam breaking step.

As illustrated in FIG. 1, the mixture of entrained liquid and foam 40 treated in the foam breaker 36 by the foam breaking means 38 may be discharged from the lower portion of the foam breaker 36 through conduit 44 to a foam clarification vessel 46.

In the clarification vessel 46, the concentrated foam 42 is separated from the liquid portion 48 which is discharged from the clarification vessel 46 through conduit 50 and further treated in a primary or secondary treatment system 52 before discharging the liquid from the treatment system through conduit 54. Liquid in conduit 56 from the lower portion of the foaming vessel may also be combined with the liquid 48 from the clarification vessel 46 for treatment in the primary or secondary treatment system 52.

A minor portion of the concentrated foam 42 is discharged from the clarification vessel 46 as a sludge 58 while a substantial portion of the concentrated foam 18 is recycled to the mixing vessel 12. Due to the large amount of recycled foam 18, very little sludge 58 for landfill or incineration is generated.

Figure 2:
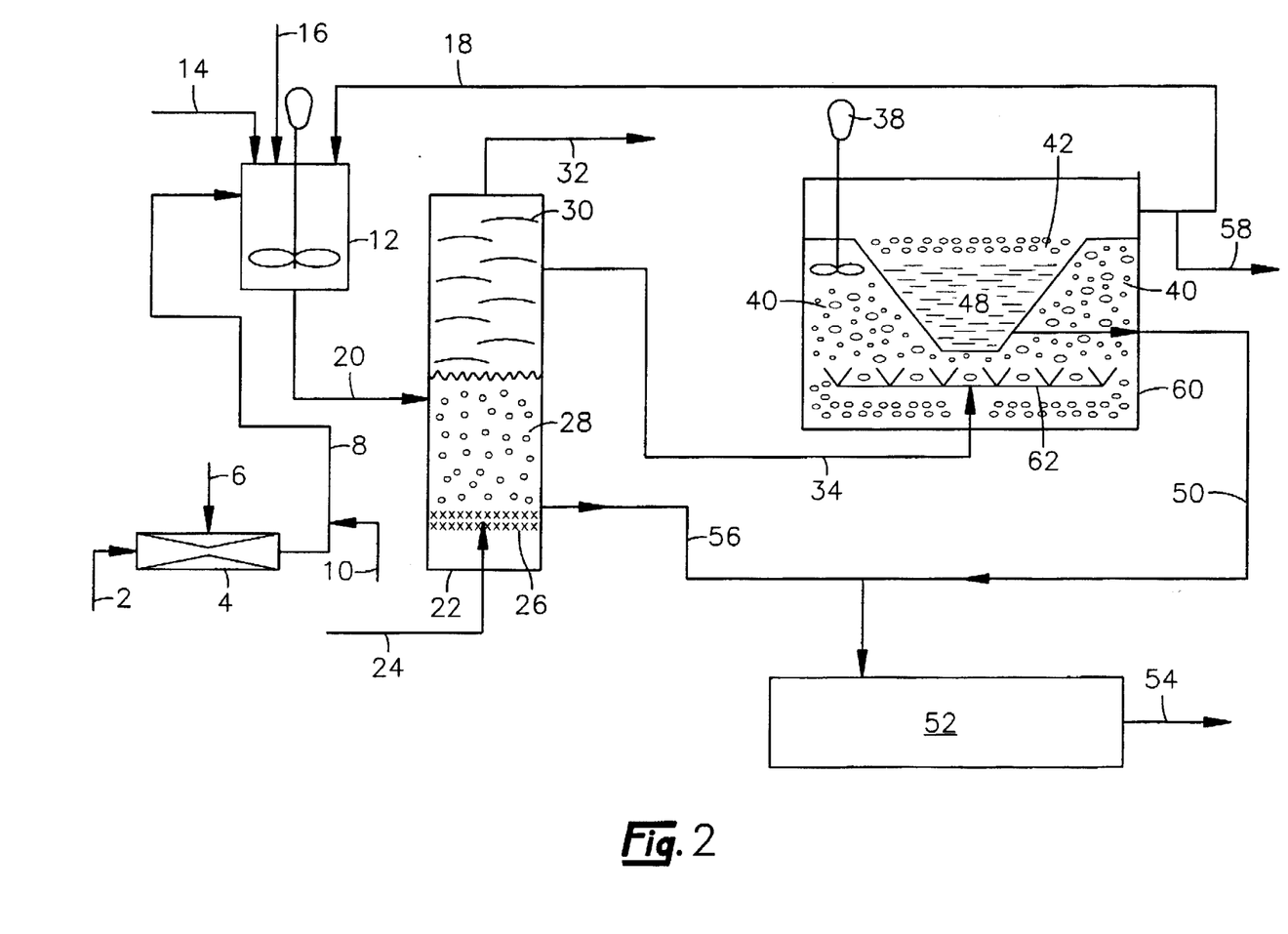
FIG. 2 is a block flow diagram of an alternative embodiment of the preferred treatment system of the invention.

An alternative treatment system is illustrated in FIG. 2. In this system, the foam breaker and clarification vessels are combined into a single vessel 60 having a foam inlet distributor 62 for introducing the foam containing entrained liquids into the vessel. As with the clarifier 46 of FIG. 1, the concentrated foam 42 is removed from the upper portion of vessel 60 while the liquid 48 released from the mixture of foam and entrained liquid 40 as the foam is broken is collected and discharged through conduit 50 to a primary or secondary treatment system 52. The other components of the system are similar to those described and illustrated by FIG. 1.

The following examples are given by way of illustration and are not meant to limit the invention.

EXAMPLE 1

An $F_D F_E$ mixture of the first chlorine bleaching stage filtrate and the first alkaline extraction stage filtrate of an elemental chlorine free bleaching plant having a pH of 7.0 and an initial COD level of 1016 mg/L and an initial color of 1520 mg/L was treated with various coagulants at various dosage rates. The $F_D F_E$ mixture was mixed with the coagulates for 1-2 minutes at a high agitation rate. Next, the effluent was treated with 10 mg/L of MAGNIFLOC 1590C flocculent available from Cytec Industries, Inc. of West Patterson, N.J. and agitated at a low rate for 1-2 minutes. In some examples, 30 mg/L of EMCOL CC-42 surfactant available from Witco Corporation of Oakland, N.J. were added prior to the foaming column. The chemically treated effluent (1 liter) was then aerated in a foaming column for 5 minutes at a rate of 1 L/min. The foaming column was a cylindrical plastic column 3 inches in diameter and 30 inches high. The lower portion of the foaming column was equipped with a fritted disk having a mesh size of 600 microns. Air was introduced into the aeration column through the fritted disk. After foaming, the foam was collected in a separation funnel over a period of 5 to 8 minutes by siphoning the foam from the foaming column using reduced pressure in the separation funnel. The separation funnel allowed the foam to collapse and separate into two phases, a foam concentrate as the upper phase and a lower liquid phase. The lower liquid phase in the separation funnel was combined with the liquid phase from the foaming column and analyzed for removal of COD and color. The concentrated foam was discarded or recycled to the combined filtrates prior to the foaming column. The color and COD of the combined liquid phases were analyzed with a HACH DR/2000 instrument by Hach, of Loveland, Colo. The removal percentages of COD and color were calculated by comparing the COD and color concentrations of the filtrates before and after foam separation. Results of the runs are illustrated in Table 1.

combination or the MAGNIFLOC-634/MAGNIFLOC-1590C combination when the foam separation is enhanced with these chemicals.

EXAMPLE 2

In this example, the effect of a surfactant on foaming tendencies of an $F_E$ filtrate was demonstrated. The $F_E$ filtrate had an initial COD level of 2116 mg/L, an initial color of 2750 mg/L and a pH of 7.0 and was treated with 500 mg/L of polyaluminum chloride solution (PAC), 10 mg/L of MAGNIFLOC 1590C flocculent and various amounts of CDEA as a surfactant. The methods for foaming, separation of the foam and analysis of the liquids were generally in accordance with the procedures described in Example 1. Results of the runs are illustrated in Table 2.

TABLE 2

| Sample No. | PAC (mg/L) | CDEA (mg/L) | COD (mg/L) | COD (Red. %) | Color (mg/L) | Color (Red. %) |
|---|---|---|---|---|---|---|
| 1 | 500 | 20  | 1592 | 25 | 2000 | 27 |
| 2 | 500 | 60  | 1588 | 25 | 2000 | 27 |
| 3 | 500 | 100 | 1728 | 18 | 1875 | 32 |
| 4 | 500 | 140 | 1608 | 24 | 1925 | 30 |
| 5 | 500 | 180 | 1596 | 25 | 1700 | 38 |

As illustrated by the foregoing example, the surfactant appears to have little or no effect on the COD and color removal efficiency of the chemically assisted foam removal system of the present invention. Accordingly, the soluble lignin- and extractive-based compounds from an alkaline extraction stage of a pulp bleaching plant appear to have sufficient natural foaming tendencies due to their surface-active characteristics.

EXAMPLE 3

In this series of samples the $F_D F_E$ mixtures were treated with various flocculants at a pH of 5.0 and with two different coagulants. The $F_D F_E$ mixtures had an initial color of 1330 mg/L. The chemically treated $F_D F_E$ mixture were aerated in a foaming column with 1.8 L/min of air for 5 minutes by

TABLE 1

| Sample No. | Coagulant | Coagulant (mg/L) | EMCOL CC-42 (yes/no) | COD (mg/L) | COD (Red. %) | Color (mg/L) | Color (Red. %) |
|---|---|---|---|---|---|---|---|
| 1 | CDEA[1] | 200 | yes | 840 | 22 | 620 | 60 |
| 2 | HEXAFLOC 820Z[2] | 60 | no | 701 | 31 | 760 | 50 |
| 3 | MAGNIFLOC 634[3] | 60 | no | 731 | 28 | 866 | 43 |
| 4 | BETZ CDP-99007[4] | 60 | yes | 924 | 9 | 995 | 35 |
| 5 | polyaluminum chloride solution | 1000 | yes | 636 | 37 | 190 | 88 |
| 6 | PASS[5] | 1000 | yes | 640 | 37 | 240 | 84 |
| 7 | PASS/CDEA | 1000/200 | yes | 632 | 38 | 215 | 86 |

[1]CDEA — cetyldimethylethyl-ammonium bromide available from Sigma Chemical Company of St. Louis, Missouri
[2]HEXAFLOC 820Z — proprietary formulation available from Hexagon Chemical Company of Louisville, Kentucky.
[3]MAGNIFLOC 634 — polyquaternary amine in a water solution available from Cytec Industries, Inc. of West Patterson New Jersey.
[4]BETZ CDP-99007 — a petroleum distillate available from Betz Laboratories, Inc. of Trevose, Pennsylvania
[5]PASS — polymer basic aluminum-silicate sulfate available from General Laum & Chemical Corporation of Holland, Ohio.

As the foregoing example illustrates, substantial COD and color removal may be obtained at low levels of chemical usage and without the need for a surfactant at a neutral pH with either the HEXAFLOC-820Z/MAGNIFLOC-1590C blowing air through a fritted disk having a mesh size of 4 to 8 microns. Otherwise, the operating procedures and analysis of the results is in accordance with the procedures of Example 1. Results of these runs are illustrated in Table 3.

TABLE 3

| Sample No. | Coagulant | (mg/L) | Flocculent | (mg/L) | Color (mg/L) | Color (Red. %) |
|---|---|---|---|---|---|---|
| 1 | MAGNIFLOC-634 | 100 | DISCOFLOC-775[1] | 4 | 285 | 79 |
| 2 | MAGNIFLOC-634 | 100 | MAGNIFLOC-1590C[2] | 4 | 255 | 81 |
| 3 | MAGNIFLOC-634 | 100 | HEXAFLOC-808ZX[3] | 4 | 220 | 83 |
| 4 | HEXAFLOC-820Z | 100 | Anionic Stk Poly | 4 | 260 | 80 |
| 5 | HEXAFLOC-820Z | 100 | MAGNIFLOC-1590C | 4 | 260 | 80 |
| 6 | HEXAFLOC-820Z | 100 | HEXAFLOC-808ZX | 4 | 245 | 82 |

[1]DISCOFLOC-775 — an anionic polyacrylamide in a water-in-oil emulsion available from Callaway Chemical Company, a division of Exxon Chemical Company of Columbus, Georgia.
[2]MAGNIFLOC-1590C — a cationic polyacrylamide in a water-in-oil emulsion available from Cytec Industries, Inc. of West Patterson, New Jersey.
[3]HEXAFLOC-808ZX — an anionic polyacrylamide in a water-in-oil emulsion available from Hexagon Chemical Company of Louisville, Kentucky.

The foregoing example illustrates that as little as 4 mg/L of flocculent may be used to promote sufficient floc growth necessary for optimum color removal. Furthermore, the color removal efficiency was relatively insensitive to the type of flocculent used.

EXAMPLE 4

In this example, a series of $F_E$ $F_E$ mixtures were treated and foamed using two sizes of fritted disks to illustrate the effect that the bubble size had on the COD and color removal efficiencies. For this series of runs, the combined $F_D F_E$ mixtures had a pH of 7.0. The $F_D F_E$ mixtures had an initial COD level of 996 mg/L and an initial color content of 1435 mg/L. The $F_D F_E$ mixtures were treated with 4 mg/L of MAGNIFLOC 1590C flocculent prior to foaming. The chemically treated $F_D F_E$ mixtures were aerated in a foaming column with 1.8 L/min of air for 5 minutes by blowing air through the fritted disk in the bottom of the column. Otherwise, the operating procedures and analysis of the results is in accordance with the procedures of Example 1. Results of these runs are illustrated in Table 4.

As illustrated by the foregoing example, the use of a fritted disk with mesh sizes of 4–8 microns to generate the foam resulted in the removal 15–20 % more color and COD than did a mesh size of 600 microns. Accordingly, foam separation color removal efficiency may depend upon the number of fine air bubbles which are available to remove small size color flocs from the liquid mixture being treated in the foaming vessel.

EXAMPLE 5

In this series of samples, the effect of pH on the COD and color removal efficiency was demonstrated. The $F_D F_E$ mixtures were obtained from an elemental chlorine free bleaching sequence and had an initial COD level of 996 mg/L and an initial color of 1435 mg/L. For this series of runs, 4 mg/L of flocculent were used and the samples were aerated in a foaming column at 1.8 L/min. for 5 minutes using a 600 micron mesh fritted disk. All other conditions and procedures were the same as in Example 1. Results of the runs are illustrated in Table 5.

TABLE 4

| Sample No. | Coagulant | (mg/L) | Mesh size (microns) | COD (mg/L) | COD (Red. %) | Color (mg/L) | Color (Red. %) |
|---|---|---|---|---|---|---|---|
| 1 | MAGNIFLOC-634 | 60 | 600 | 717 | 28 | 818 | 43 |
| 2 | MAGNIFLOC-634 | 60 | 4–8 | 518 | 48 | 474 | 67 |
| 3 | HEXAFLOC-820Z | 60 | 600 | 687 | 31 | 718 | 50 |
| 4 | HEXAFLOC-820Z | 60 | 4–8 | 538 | 46 | 445 | 69 |

TABLE 5

| Sample No. | Coagulant | (mg/L) | pH | COD (mg/L) | COD (Red. %) | Color (mg/L) | Color (Red. %) |
|---|---|---|---|---|---|---|---|
| 1 | MAGNIFLOC-634 | 50 | 1.5 | 548 | 45 | — | — |
| 2 | MAGNIFLOC-634 | 50 | 3 | 584 | 41 | 310 | 78 |
| 3 | MAGNIFLOC-634 | 50 | 4 | 704 | 29 | 560 | 61 |
| 4 | MAGNIFLOC-634 | 50 | 5 | 700 | 30 | 810 | 43 |
| 5 | MAGNIFLOC-634 | 50 | 7 | 717 | 28 | 818 | 43 |
| 6 | HEXAFLOC-820Z | 50 | 1.5 | 572 | 43 | — | — |
| 7 | HEXAFLOC-820Z | 50 | 3 | 492 | 50 | 320 | 78 |
| 8 | HEXAFLOC-820Z | 50 | 4 | 596 | 40 | 580 | 60 |

TABLE 5-continued

| Sample No. | Coagulant | (mg/L) | pH | COD (mg/L) | COD (Red. %) | Color (mg/L) | Color (Red. %) |
|---|---|---|---|---|---|---|---|
| 9 | HEXAFLOC-820Z | 50 | 5 | 692 | 31 | 720 | 50 |
| 10 | HEXAFLOC-820Z | 50 | 7 | 687 | 31 | 718 | 50 |

The foregoing runs demonstrate that COD and color removal efficiencies tend to increase at lower pH's. Accordingly, high treatment efficiencies may be obtained by either decreasing the pH of the $F_D F_E$ mixtures or by increasing the amount of coagulant and flocculent used or by a combination of both methods.

EXAMPLE 6

The following runs demonstrate the effectiveness of the present methods for decreasing the toxicity of the various effluent streams from a bleach plant. The toxicity of the effluent streams was determined by the MICROTOX acute toxicity test. For these series of runs, the effluent streams were treated at a pH of 5.0 and were foamed in a aeration column having a 4–8 mesh micron disk using 2.0 L/min. of air for 5 minutes. The results are illustrated in Table 6.

of the foam concentrate sludge thus generated, 50 mg/L MAGNIFLOC 634, 4 mg/L MAGNIFLOC 1590C and 1 L/min. of air for 5 minutes through a 4–8 micron fritted disk. The results are illustrated in Table 7.

TABLE 7

| Pollutant | Units | Biotreatability Influent | Biotreatability Effluent | Removal (%) |
|---|---|---|---|---|
| BOD | mg/L | 220 | <2.0 | 99 |
| COD | mg/L | 757 | 477 | 37 |
| MICROTOXICITY, 15-min. | EC-50, % | 10 | >100 | 100 |
| AOX | mg/L | 24 | 10 | 58 |

TABLE 6

| Sample No. | Effluent Identity | Coagulant | (mg/L) | Flocculent | (mg/L) | MICROTOXICITY (5-min.) EC-50 (%) | MICROTOXICITY (5-min.) Red. (%) |
|---|---|---|---|---|---|---|---|
| 1 | whole mill | none | — | none | — | 65 | 48 |
| 2 | whole mill | HEXAFLOC-820Z | 100 | MAGNIFLOC-1590C | 20 | 78 | 73 |
| 3 | whole mill | MAGNIFLOC-634 | 100 | MAGNIFLOC-1590C | 20 | 88 | 86 |
| 4 | alkaline sewer | none | — | none | — | 46 | 63 |
| 5 | alkaline sewer | HEXAFLOC-820Z | 100 | MAGNIFLOC-1590C | 10 | >100 | 100 |
| 6 | alkaline sewer | MAGNIFLOC-634 | 100 | MAGNIFLOC-1590C | 10 | >100 | 100 |
| 7 | $F_E$ filtrate | none | — | none | — | >100 | 100 |
| 8 | $F_E$ filtrate | HEXAFLOC-820Z | 100 | MAGNIFLOC-1590C | 20 | >100 | 100 |
| 9 | $F_E$ filtrate | MAGNIFLOC-634 | 100 | MAGNIFLOC-1590C | 20 | >100 | 100 |
| 10 | $F_B$ filtrate | none | — | none | — | 59 | 82 |
| 11 | $F_B$ filtrate | HEXAFLOC-820Z | 100 | MAGNIFLOC-1590C | 20 | 72 | 90 |
| 12 | $F_B$ filtrate | MAGNIFLOC-634 | 100 | MAGNIFLOC-1590C | 20 | >100 | 100 |

The foregoing runs illustrate that the toxicity removal efficiency may be increased particularly for whole mill plant effluent and alkaline effluents by the use of the chemically assisted foam separation techniques of the present invention. In all cases, it appears that foam separation techniques alone without the use of coagulants and flocculants are less effective than the foam separation techniques using the preferred coagulants and flocculants of the present invention.

EXAMPLE 7

Use of the chemically assisted foam separation techniques of the present invention, was found to greatly increase the biotreatability of the treated streams. In this series of runs, the $F_D F_E$ mixtures from an elemental chlorine free bleaching mill initially having 900 mg/L color and 938 mg/L COD were bio-treated after the chemically assisted foam separation technique conducted generally in accordance with the foregoing examples using a recycle amount of 99.75 vol. %

As illustrated in Table 7, a substantial reduction in BOD, COD, toxicity and AOX may be obtained by conventional biotreatment of the influent stream to the biotreatment plant which has previously been treated with coagulant, flocculants and has undergone foam separation according to the present invention.

EXAMPLE 8

In this series of runs, the overall response of various effluents to the chemically assisted foam separation techniques of the present invention are compared to foaming techniques in the absence of any chemical treatment. For these runs the pH was 5.0, the aeration rate was 2.0 L/min. for 5 minutes and the mesh size of the fritted disk was 4–8 microns. Otherwise, the treatment conditions and analytical techniques are the same as those used for EXAMPLE 1. The results are illustrated in Table 8.

TABLE 8

| Run No. | Effluent | Coagulant | mg/L | Flocculent | mg/L | Color mg/L | Red. % | COD mg/L | Red. % | Toxicity 5-min. EC-50, % | Red. % |
|---|---|---|---|---|---|---|---|---|---|---|---|
| 1 | whole mill | none | — | none | — | 1045 | 5.4 | 444 | 20.1 | 65 | 48 |
| 2 | whole mill | H820[1] | 100 | H808ZX[2] | 4 | 170 | 84.6 | 286 | 48.6 | 78 | 73 |
| 3 | whole mill | M634[3] | 100 | M1590C[4] | 4 | 195 | 82.4 | 298 | 46.4 | 88 | 86 |
| 4 | alkaline sewer | none | — | none | — | 1001 | 24.7 | 568 | 23.9 | 46 | 63 |
| 5 | alkaline sewer | H820 | 100 | H808ZX | 4 | 245 | 82 | 486 | 38.3 | >100 | 100 |
| 6 | alkaline sewer | M634 | 100 | M1590C | 4 | 225 | 79.6 | 304 | 45.3 | >100 | 100 |
| 7 | $F_E$ Filtrate | none | — | none | — | — | — | — | — | >100 | 100 |
| 8 | $F_E$ Filtrate | H820 | 100 | H808ZX | 4 | 1445 | 2.7 | 1334 | 29.6 | >100 | 100 |
| 9 | $F_E$ Filtrate | M634 | 100 | M1590C | 4 | 1650 | −11.1 | 1694 | 10.7 | >100 | 100 |
| 10 | $F_E$ Filtrate | none | — | none | — | 2787 | 17.7 | 1684 | 16.6 | 59 | 82 |
| 11 | $F_E$ Filtrate | H820 | 100 | H808ZX | 4 | 2070 | 38.9 | 1446 | 28.4 | 72 | 90 |
| 12 | $F_E$ Filtrate | M634 | 100 | M1590C | 4 | 2210 | 34.8 | 1518 | 24.9 | >100 | 100 |
| 13 | $F_E$ Filtrate | H820 | 200 | H808ZX | 4 | 995 | 70.6 | 1218 | 39.7 | 100 | 100 |
| 14 | $F_E$ Filtrate | M634 | 200 | M1590C | 4 | 1165 | 65.6 | 1256 | 37.8 | 100 | 100 |
| 15 | $F_E$ Filtrate | H820 | 300 | H808ZX | 4 | 570 | 83.2 | 1114 | 44.9 | 93 | 98 |
| 16 | $F_E$ Filtrate | M634 | 300 | M1590C | 4 | 735 | 78.3 | 1158 | 42.7 | 96 | 99 |

[1]H820 — HEXAFLOC-820Z
[2]H808ZX — HEXAFLOC-808ZX
[3]M634 — MAGNIFLOC-634
[4]M1590C — MAGNIFLOC-1590C

As illustrated in Table 8, chemically assisted foam separation techniques may substantially improve the removal of color, COD and toxicity levels in various bleach plant effluent streams over removal techniques using foam separation without the use of coagulants and flocculants.

EXAMPLE 9

In order to determine the effect of recycling a substantial portion of the foam concentrate rather than removing it from the treatment system, 1 liter samples of an $F_D F_E$ mixture having a pH of 3.0 were treated with 50 mg/L of MAGNIFLOC-634 coagulant and 4 mg/L of MAGNIFLOC-1590C. The chemically treated samples were then aerated in a foaming column having a 4 micron mesh fritted disk with air for 5 minutes at a rate of 1 L/min. Most of the concentrated foam (99.75 vol. %) from a previous run was recycled and mixed with the samples so that the final foam sludge was 0.25 vol. % of the original total foam sludge volume (10 mL out of 10 L). Results of the runs are illustrated in Table 9.

TABLE 9

| Cycle | Color (mg/L) | (Red. %) | COD (mg/L) | (Red. %) | AOX (mg/L) | (Red. %) |
|---|---|---|---|---|---|---|
| initial | 1015 | — | 910 | — | 26 | — |
| 1 | 515 | 49 | 760 | 16 | 21 | 20 |
| 2 | 495 | 51 | 758 | 17 | — | — |
| 3 | 465 | 54 | 736 | 19 | 22 | 15 |
| 4 | 460 | 55 | 736 | 19 | — | — |
| 5 | 460 | 55 | 740 | 19 | 21 | 20 |
| 6 | 450 | 56 | 756 | 17 | — | — |
| 7 | 440 | 56 | 716 | 21 | — | — |
| 8 | 460 | 55 | 742 | 18 | 20 | 23 |
| 9 | 445 | 56 | 742 | 18 | — | — |
| 10 | 440 | 57 | 726 | 20 | 21 | 20 |

After the first cycle, the solids content of the sludge was 0.8% of the total sludge volume. After 10 cycles, the solids content of the sludge was increased to 1.6% of the total sludge volume. In commercially practiced coagulation systems, the solids content of the sludge is typically 0.5 to 2.0% of the total sludge volume.

Furthermore, even after 10 cycles, recycling the concentrated foam appeared to have little or no effect on the color, COD and AOX removal efficiency of the chemically assisted foam separation techniques of the present invention. Accordingly, the present invention not only provides a means for effectively reducing the levels of COD, AOX and color in bleach plant effluents, it also produces much less sludge for disposal because of foam concentrate recycling and it provides a means to greatly increase the solids concentration of the sludge thus reducing the demand on the plant dewatering systems.

Having described the invention and preferred embodiments thereof, it will be recognized by those of ordinary skill that variations in the invention are within the spirit and scope of the appended claims.

What is claimed is:

1. A method for treating effluent from a kraft pulp bleaching sequence having a chlorine and/or chlorine dioxide stage generating an organic chloride compound-containing filtrate ($F_D$) and an alkaline extraction stage generating an extraction state filtrate ($F_E$) wherein the $F_D$ and $F_E$ filtrates contribute to the amount of the chemical oxygen demand (COD), adsorbable organic halides (AOX), color bodies and toxicity in the bleach plant effluent, the method comprising:

(a) intensely mixing the $F_D$ filtrate with the $F_E$ filtrate in a volume ratio of $F_D$ to $F_E$ within the range of from about 0.5:1 to about 4:1 for a mixing interval sufficient to reduce the amount of AOX in the $F_D$ thereby providing an $F_D F_E$ mixture;

(b) contacting the $F_D F_E$ mixture with a coagulating compound and a foam concentrate to form a pre-foam mixture;

(c) treating the pre-foam mixture with a flocculating compound to form a floc in the pre-foam mixture;

(d) foaming the floc with an amount of air sufficient to form a foam containing the floc and entrained liquid;

(e) collecting the foam containing floc and entrained liquid;

(f) breaking the foam in a foam breaker in order to release the entrained liquid wile forming a foam concentrate;

(g) separating the foam concentrate from the entrained liquid in a foam clarifier; and (h) recycling a substantial portion of the foam concentrate to the $F_D F_E$ mixture.

2. The method of claim 1 wherein the pulp bleaching sequence is an elemental chlorine free bleaching sequence.

3. The method of claim 1 wherein the $F_E$ filtrate is obtained from a first chlorine dioxide ($D_o$) bleaching stage.

4. The method of claim 1 wherein the alkaline extraction stage is an $E_{op}$ stage.

5. The method of claim 1 wherein the pH of the $F_D F_E$ mixture is within the range of from about 3 to about 4.5.

6. The method of claim 1 wherein the are $F_D$ and $F_E$ filtrates are mixed from about 30 seconds to about 5 minutes.

7. The method of claim 1 wherein the coagulating compound is provided in an amount within the range of from about 20 to about 300 mg/L of the $F_D F_E$ mixture.

8. The method of claim 1 wherein the flocculating compound is provided within the range of from about 20 to about 80 mg/L of the $F_D F_E$ mixture.

9. The method of claim 1 further comprising adding a surfactant to the pre-foam mixture.

10. The method of claim 1 wherein the amount of air is within a gas to liquid ratio of from about 0.1:1 to about 1.0:1 standard cubic feet per minute per gallon (SCFM/gal.).

11. The method of claim 1 further comprising treating the liquid phase from the foam clarification section in a primary or secondary treatment system.

12. A process for treating filtrate streams from a chlorine-based pulp bleaching sequence having a chlorine and/or chlorine dioxide stage generating an organic chloride compound-containing filtrate ($F_D$) and an alkaline extraction stage generating an extraction stage filtrate ($F_E$), the process comprising:

(a) vigorously mixing the $F_D$ filtrate with the $F_E$ filtrate in a volume ration of $F_D$ to $F_E$ within the range of from about 0.5:1 to about 4:1 for a mixing interval sufficient to reduce the amount of AOX in the $F_d$ thereby providing, a filtrate mixture ($F_D F_E$);

(b) contacting the $F_D F_E$ mixture with a coagulating compound to provide a hydrophobic color containing component in the mixture;

(c) contacting the coagulant contacted mixture with a foam concentrate;

(d) treating the coagulant and foam concentrate contacted mixture with a flocculating agent to produce a flocculated mixture containing the hydrophobic solids and foam concentrate;

(e) foaming the flocculated mixture with air in a foaming vessel to form a foam;

(f) collecting the foam containing the floc and entrained liquid;

(g) breaking the foam to release a substantial portion of the entrained liquid under conditions which preserve the floc and which form a foam concentrate;

(h) separating the foam concentrate from the entrained liquid; and (i) recycling a substantial portion of the foam concentrate to the flocculated mixture.

13. The process of claim 12 wherein the pulp bleaching sequence is an elemental chlorine free bleaching sequence.

14. The process of claim 12 wherein the chlorine dioxide stage is a first chlorine dioxide ($D_o$) bleaching stage.

15. The process of claim 12 wherein the alkaline extraction stage is an $E_{op}$ stage.

16. The process of claim 12 wherein the pH of the $F_D F_E$ mixture is within the range of from about 3 to about 4.5.

17. The process of claim 12 wherein the coagulating compound is provided in an amount within the range of from about 20 to about 300 mg/L of the $F_D F_E$ mixture.

18. The process of claim 12 wherein the flocculating compound is provided in an amount within the range of from about 20 to about 80 mg/L of the $F_E F_E$ mixture.

19. The process of claim 12 further comprising adding a surfactant to the flocculated mixture.

20. The process of claim 12 wherein the flocculated mixture is foamed with an amount of air having a gas to liquid ratio of from about 0.1:1 to about 1.0:1 standard cubic feet per minute per gallon (SCFM/gal.).

* * * * *

UNITED STATES PATENT AND TRADEMARK OFFICE
CERTIFICATE OF CORRECTION

PATENT NO. : 5,670,020
DATED : September 23, 1997
INVENTOR(S) : Caifang Yin & Christopher P. Hung It is certified that error appears in the above-indentified patent and that said Letters Patent is hereby corrected as shown below:

Column 11, line 26, change "$F_E F_E$" to -- $F_D F_E$ --

Column 17, line 7, change "$F_E$" to -- $F_D$ --

Column 17, line 36, change "ration" to -- ratio --

Column 17, line 38, change "$F_d$" to -- $F_D$ --

Column 18, line 34, change "$F_E F_E$" to -- $F_D F_E$ --

Signed and Sealed this

Sixteenth Day of December, 1997

Attest:

BRUCE LEHMAN

Attesting Officer

Commissioner of Patents and Trademarks